J. CHALMERS.
TRANSMISSION GEARING.
APPLICATION FILED AUG. 8, 1912.
1,081,092.
Patented Dec. 9, 1913
2 SHEETS—SHEET 1.
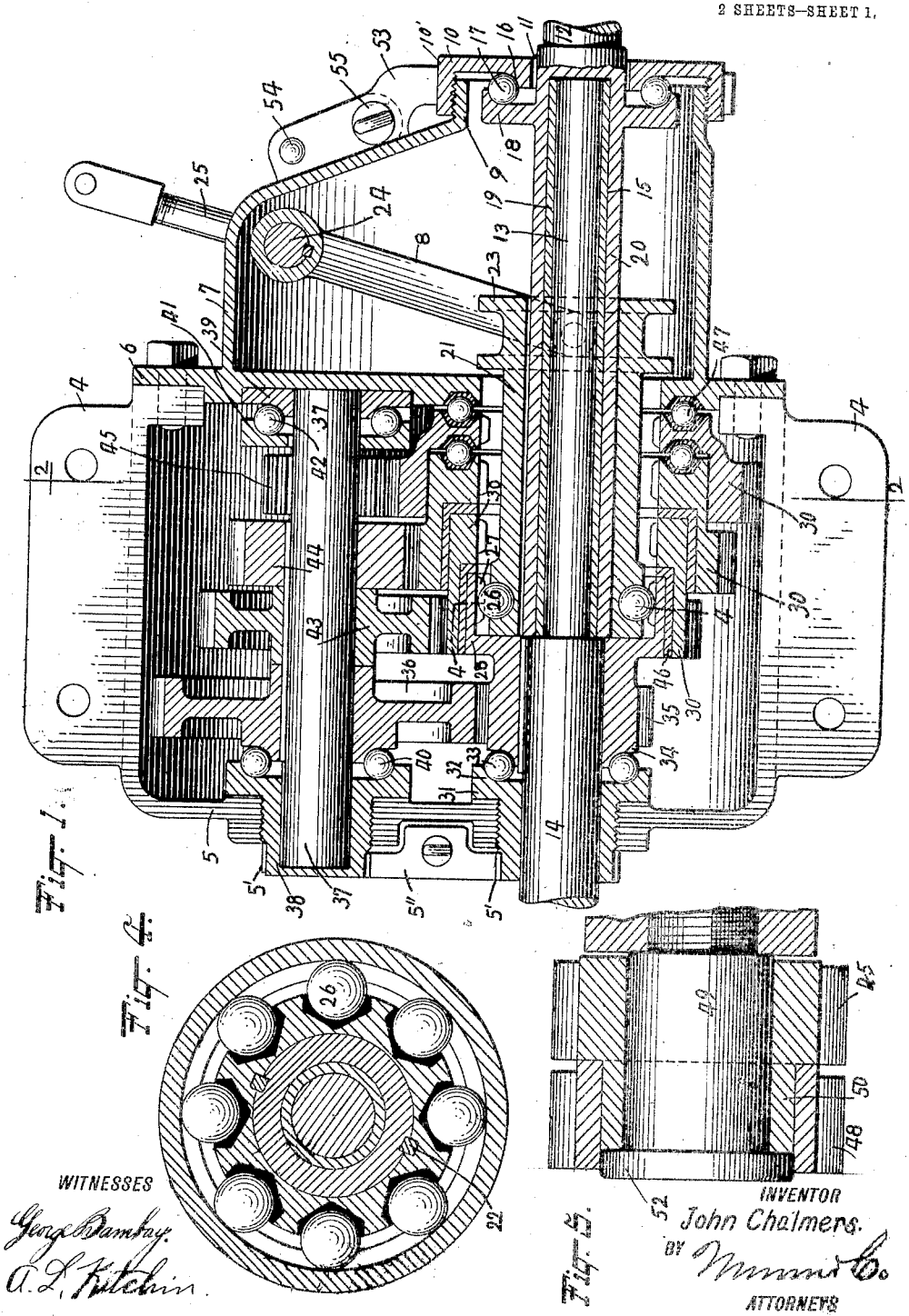

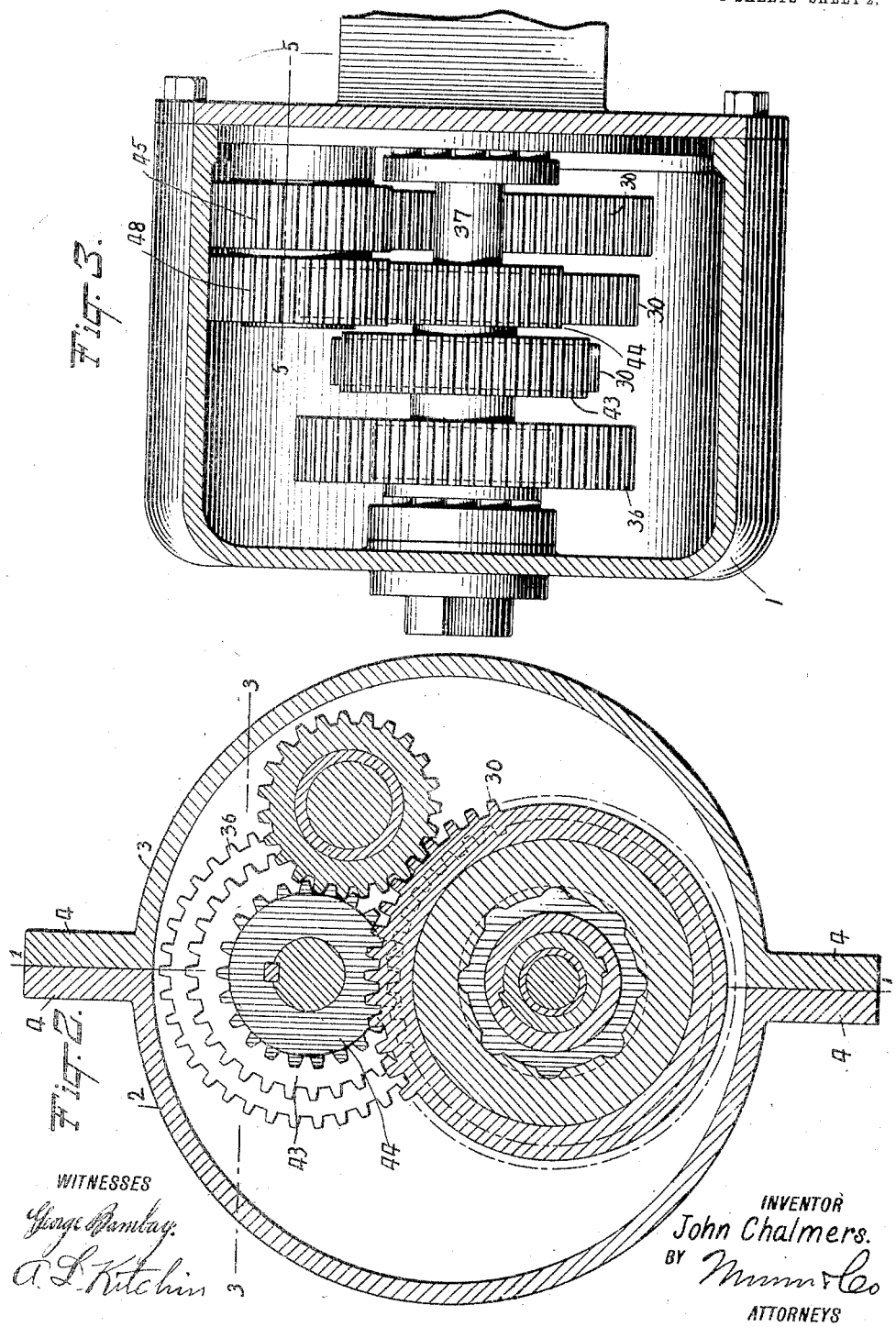

UNITED STATES PATENT OFFICE.

JOHN CHALMERS, OF QUINCY, MASSACHUSETTS.

TRANSMISSION-GEARING.

1,081,092.     Specification of Letters Patent.     Patented Dec. 9, 1913.

Original application filed February 16, 1911, Serial No. 608,958. Divided and this application filed August 3, 1912. Serial No. 714,028.

*To all whom it may concern:*

Be it known that I, JOHN CHALMERS, a subject of the King of Great Britain, and a resident of Quincy, in the county of Norfolk and State of Massachusetts, have invented a new and Improved Transmission-Gearing, of which the following is a full, clear, and exact description.

This invention relates to improvements in transmission gearing, and has for an object to provide an improved structure in which power may be transmitted from one shaft to another through a plurality of gearing designed to change the ratio of rotation at the will of the operator.

Another object of the invention is to provide a train or system of gearing for transmitting motion from one shaft to another at various ratios, and for reversing the direction of rotation of the driven shaft whenever desired, said reversal being at a reduced speed.

A still further object of the invention is to provide a transmission gearing which will permit the transmission of motion from one shaft to another axially, at different speeds, and in different directions, if desired.

In carrying out the objects of the invention, a pair of axially-arranged shafts are provided and mounted in a suitable housing, which carries a plurality of banks of gears continually meshing and associated with means for clutching and unclutching the driven shaft with certain of the gears. On the driving shaft is arranged a gear wheel designed to mesh with what may be termed a master gear wheel rigidly secured to an auxiliary shaft. The auxiliary shaft carries a plurality of gears of different sizes, designed to mesh with gear rings or sleeves associated with the clutch, which may connect and disconnect the same with the driven shaft. One of these last-mentioned gears is arranged to mesh with reversing gear mechanism which is adapted to be connected with the driven shaft upon an extreme movement in one direction of the clutch mechanism.

A practical embodiment of the invention is represented in the accompanying drawings forming a part of this specification, in which similar characters of reference indicate corresponding parts in all the views.

Figure 1 is a longitudinal vertical section through an embodiment of the invention; Fig. 2 is a section through Fig. 1, approximately on the line 2—2; Fig. 3 is a section through Fig. 2, on the line 3—3; Fig. 4 is a section of Fig. 1 approximately on the line 4—4, the same being shown on an enlarged scale; and Fig. 5 is a fragmentary sectional view, approximately on the line 5—5 of Fig. 3.

Referring to the accompanying drawings by numerals, 1 indicates a housing which is preferably divided into sections 2 and 3, held together by suitable bolts provided in the respective flanges 4. The housing 1 is provided with a solid end 5 and with a removable end 6, having a housing or casing 7 extending therefrom for accommodating a controlling lever 8 and associated parts. The housing 7 is provided with an annular externally-threaded extension 9 which accommodates an internally-threaded cap 10. The cap 10 is provided with an aperture 11 through which the driven shaft 12 projects, so that the reduced portion 13 of the driving shaft 14 may properly fit into the bore 15. The cap 10 is provided with a curved raised portion 16 defining a cone designed to receive balls 17 which are held properly in place by a cup 18, preferably formed integral with the driven shaft 12.

Arranged between the walls of the bore 15 of the driven shaft 12 and the reduced portion 13 is a bearing member 19 formed of brass, Babbitt metal, or any other desired material.

Surrounding the end 20 of the shaft 12 is a clutch sleeve 21, splined thereto by suitable keys 22 so that the sleeve 21 may freely reciprocate while turning with the driven shaft. The outer end of the sleeve 21 is provided with a spool 23 in which the end of the lever 8 is fitted, so that when the lever 8 is swung, the sleeve will move back and forth. The lever 8 is keyed or otherwise rigidly secured to the shaft 24, carrying on one end an operating member 25 arranged exteriorly of the housing 7. The sleeve 21 is provided with a plurality of balls 26 designed to engage lugs or raised portions 27 on the cup-shaped member 28 and on the respective gear rings 30. It will be evident that raised portions or lugs could be used instead of the balls, if desired, without in any way departing from the spirit of the invention, the balls or lugs being used merely as means for connecting the sleeve 21 and the raised portions 27. As the sleeve 21 is moved back and forth, the same is connected with and disconnected from the raised portions 27 and consequently with the respective gear rings 30.

The shaft 14 is mounted in a suitable bearing 31 formed with a cup surface 32 for accommodating anti-friction members 33, which are held in place by a cone structure 34 formed on the hub of a gear 35. The gear 35 is keyed, or otherwise rigidly secured to the shaft 14 so as to always rotate therewith. On the end of the hub opposite the cone 34 the same is formed into a cup 28 and has the extensions or projections 27 formed thereon for accommodating the balls 26. When the balls 26 are in engagement with the projections 27 of the cup 28, the shafts 14 and 12 are directly coupled, so that they will rotate at the same speed. The gear wheel 35 is designed to mesh continually with the master gear 36 which is keyed to a shaft 37 mounted in suitable bearings 38 and 39. In order to reduce the friction the bearing 38 is formed with a cup for receiving anti-friction members 40, held in place by a suitable cone formed on the hub of the master gear 36. At the opposite end of the shaft 37, the bearing 39 is formed into a cone co-acting with a cup 41 rigidly secured to the shaft 37 and bearing against anti-friction members 42. In this way the anti-friction members 40 and 42 support and hold in position the shaft 37, while the ends of said shaft rotate freely in the bearings 38 and 39.

Associated with the master gear wheel 36 on the shaft 37 are gears 43 and 44 respectively, of different sizes, so as to transmit motion at a different ratio to the respective gear rings 30 which are made of different sizes to correspond with the gears 43 and 44, and also with a reversing gear 45 which meshes with the end ring 30 so that when the clutch sleeve 21 is moved to one extreme, the shafts are directly connected, and when moved to the opposite extreme, the driven shaft is reversed.

In order to cause the rings 30 to properly operate, anti-friction rings or cup-shaped members 46 are provided for certain of the rings 30 and anti-friction members 47 are provided for others of the rings 30.

In connection with the reversing mechanism or gearing, it will be noted that the gear wheel 44 meshes continually with a gear ring 48 and the second gear ring 30, while the gear wheel 45 meshes continually with the end gear ring 30. The gear wheel 45 is loosely mounted upon a stub shaft 49 screwed or otherwise connected to the end 6. The gear wheel 45 is provided with a reduced extension 50, over which the gear ring 48 is shrunk, or otherwise rigidly secured in place, so that the gear ring 48 and gear wheel 45 will rotate together. The shaft 49 is formed with an enlarged head 52 for preventing the gear wheel 45 from moving off its supporting shaft, so that the same will be continually held in proper position.

It will be observed that all of the gear wheels are continually in mesh and are continually rotating during the rotation of the driving shaft 14, so that in changing the ratio of drive, it is not necessary to clutch and unclutch the respective gear teeth, but merely to slide the clutch member or sleeve 21 longitudinally so as to connect the same with any particular ring 30 desired.

In arranging the cap 10, the same is provided with a plurality of notches 10' for receiving the pivotally mounted locking lever 53 which is pivotally connected at 54 to the housing 7 and locked in place by a suitable binding screw or bolt 55 mounted in a bracket secured to the housing 7.

In forming the bearings, they are provided with a plurality of notches 5' for receiving the ends of a keeper 5". The keeper 5" is secured to the end 5 in any desired way, as for instance, by being held in place by a screw extending through the keeper and into the end 5.

This application is a division of my application for clutch, Serial No. 608,958, filed February 16, 1911, and eventuating in Patent No. 1,046,440, issued December 10, 1912.

Having thus described my invention, I claim as new and desire to secure by Letters Patent:

1. In a transmission gear mechanism, a driving member, a driving gear rigidly secured to said driving member, an overhanging tubular member formed with internal projections, said overhanging member being rigidly connected with said driving gear, a master gear wheel meshing continually with said driving gear, a shaft for supporting said master gear, means for rigidly connecting said master gear and said shaft, a speed reducing gear rigidly secured to said shaft, a gear ring formed with internal spaced projections, said gear ring overlapping said overhanging tubular member, said gear ring continually meshing with said speed reducing gear, a driven member, a sliding member splined to said driven member, projecting means extending from said sliding member adapted to be moved to a position between the projections on said overhanging tubular member and the spaced projections on said gear ring at will, and means for sliding said sliding member causing said projecting means to move into the space between the spaced projections on said gear ring and into the space between the projections on said overhanging tubular member at will for directly connecting said driven member with said driving member and connecting said driven member and said driving member through said reducing gear at will.

2. In a transmission gear mechanism, a driving shaft, a driven shaft, a gear wheel connected with said driving shaft, a master gear wheel meshing with said first-mentioned gear wheel, a shaft for said master gear wheel, a plurality of reducing gear wheels rigidly secured to said last-mentioned shaft, a gear ring meshing with each of said reducing gears, a pair of reversing gear wheels, one of which meshes continually with one of said reducing gears and the other of which meshes continually with one of said gear rings, and a sliding member designed to at different times connect the gear wheel rigidly secured to the driving shaft, and the respective gear rings to said driven shaft, whereby the driven shaft is moved at different speeds without varying the speed of the driving shaft, and moved in a reverse direction without varying the direction of rotation of the driving shaft.

3. In a transmission gear mechanism, a driving shaft, a driven shaft extending axially from the driving shaft, a gear wheel connected with said driving shaft, a master gear wheel meshing with said first mentioned gear wheel, an auxiliary shaft for said master gear wheel, a plurality of reducing gear wheels rigidly secured to said auxiliary shaft, a gear ring meshing with each of said reducing gears, a pair of reversing gear wheels rigidly secured together, a gear ring continually meshing with one of said reversing gear wheels; means for holding the other of said reversing gear wheels continually in mesh with one of said reducing gear wheels, and a clutch mechanism adapted to at different times connect the gear wheel rigidly secured to said driving shaft and the respective gear ring to said driven shaft whereby the driven shaft may be moved at different speeds without varying the speed of the driving shaft and in a reverse direction without varying the direction of rotation of the driving shaft.

4. In a transmission gear mechanism, a driving shaft, a driven shaft, a gear wheel connected with said driving shaft, a master gear wheel meshing with said first mentioned gear wheel, said first mentioned gear wheel telescopically fitting over the end of said driven shaft, a plurality of gear rings surrounding said driven shaft and formed with overhanging portions, the first gear ring overhanging a part of said first mentioned gear wheel which telescopically fits over the end of said driven shaft so as to use the same as a bearing surface and the remaining gear rings overlapping the next preceding gear ring in a similar manner, an auxiliary shaft for said master gear wheel, a plurality of reducing gear wheels mounted on said auxiliary shaft and continually meshing with certain of said gear rings, a pair of reversing gear wheels, one of which is adapted to mesh with one of said gear rings and the other of which is adapted to mesh with the gear rings on said auxiliary shaft, said reversing gear wheels being rigidly secured together, and a clutch mechanism adapted to connect the telescoping portion of said first mentioned gear wheel and said respective gear rings with said driven shaft at different times whereby said driven shaft may be moved at different speeds without varying the speed of said driving shaft and may be rotated in a reverse direction without changing the direction of rotation of said driving shaft.

5. A transmission gearing comprising a gear casing, a driving shaft projecting therein, a driven shaft, a hub secured to said driving shaft, a series of gears surrounding said driving shaft, one of said gears being mounted on said hub, a countershaft, a series of gears of different sizes secured to said countershaft, the gears surrounding said driving shaft having clutch portions, a clutch slidable on said driven shaft and adapted to engage said clutch portions and temporarily lock said gears on said driven shaft, the engagement of said clutch with the clutch portion of the gear on said hub causing the direct transmission of power to said driven shaft, and the engagement of said clutch with the clutch portions of the other gears causing an indirect transmission of power through said countershaft to said driven shaft from said hub gear.

In testimony whereof, I have signed my name to this specification in the presence of two subscribing witnesses.

JOHN CHALMERS.

Witnesses:
 CHARLES H. WILSON,
 MARGUERITE B. MCCARTHY.